United States Patent

Ueno et al.

[11] Patent Number: 5,855,440
[45] Date of Patent: Jan. 5, 1999

[54] PRINTING APPARATUS CAPABLE OF PRINTING CHARACTER HAVING EMBELLISHMENT WITH BLANK PORTION

[75] Inventors: Hideo Ueno, Nagoya; Masaharu Mori, Anjo; Chitoshi Ito, Kasugai; Kazumi Kanda, Nishikasugai-gun, all of Japan

[73] Assignee: Brother Kogyo Kabushiki Kaisha, Aichi-ken, Japan

[21] Appl. No.: 861,629

[22] Filed: May 22, 1997

[30] Foreign Application Priority Data

May 24, 1996 [JP] Japan .................................. 8-129934

[51] Int. Cl.⁶ ........................................................ B41J 5/30
[52] U.S. Cl. ........................................... 400/76; 400/615.2
[58] Field of Search .......................... 400/615.2, 120.02, 400/61, 70, 76

[56] References Cited

U.S. PATENT DOCUMENTS 5,428,728  6/1995  Lung et al. .
5,636,926  6/1997  Yamaguchi ......................... 400/120.02

FOREIGN PATENT DOCUMENTS

0478369A2   4/1992   European Pat. Off. .
0573261A1  12/1993   European Pat. Off. .
 2252435    8/1992   United Kingdom .

*Primary Examiner*—John Hilten
*Attorney, Agent, or Firm*—Kane, Dalsimer, Sullivan, Kurucz, Levy, Eisele and Richard, LLP

[57] ABSTRACT

Disclosed is the tape printer 1 in which the embellishment having the outline portion and the blank portion such as the bag form, bag form with shadow or stereo form is set to the character input through the character 5 on the keyboard 3 (S9, S55), and "print color 1" and "print color 2" are set to the character by numeral (S55), and further the character is printed on the print tape 100 through the thermal printing mechanism PM, thereby the outline portion of the embellished character is printed with "print color 1" and the blank portion is printed with "print color 2".

17 Claims, 25 Drawing Sheets

FIG. 2 (A)

| S1 | INITIALIZATION |
|---|---|
| S2 | PRINT IMAGE DISPLAYING PROCESS |
| S3 | KEY INPUT ? |
| S4 | RANGE SETTING KEY ? |
| S5 | RANGE SETTING PROCESS |
| S6 | FORMAT CHANGING PROCESS WITHIN RANGE |
| S7 | PRINT KEY ? |
| S8 | PRINTING PROCESS |
| S9 | PROCESS FOR OPERATED KEY |

FIG. 3 (A)

| S5 | RANGE SETTING PROCESS |
|---|---|
| S20 | SET HEAD AND LAST POSITIONS OF RANGE TO PRESENT CURSOR POSITION |
| S21 | PRINT IMAGE DISPLAYING PROCESS |
| S22 | REVERSELY DISPLAY CHARACTERS EXISTING WITHIN RANGE BETWEEN HEAD POSITION AND LAST POSITION |
| S23 | KEY INPUT ? |
| S24 | RIGHT AND LEFT KEY ? |
| S25 | CHANGE AND STORE HEAD AND LAST POSITIONS OF RANGE |
| S26 | RETURN KEY ? |

FIG. 4 (A)

| S6   | FORMAT CHANGING PROCESS WITHIN RANGE |
|------|---------------------------------------|
| S50  | FORMAT SETTING INFORMATION IS DISPLAYED |
| S51  | KEY INPUT ? |
| S52  | RIGHT AND LEFT KEY ? |
| S53  | MOVE CURSOR TO RIGHT OR LEFT DIRECTION |
| S54  | UP AND DOWN KEY ? |
| S100 | CURSOR ON PRINT COLOR 2 ? |
| S101 | EMBELLISHMENT IS NORMAL OR EMPHASIS ? |
| S102 | NUMERAL ON "PRINT COLOR 2" IS AS SAME AS NUMERAL ON "PRINT COLOR 1" ? |
| S103 | DISPLAY "NONE" |
| S55  | CHANGE AND STORE FORMAT ACCORDING TO CURSOR |
| S56  | RETURN KEY ? |

FIG. 5 (A)

| S8 | PRINTING PROCESS |
|---|---|
| S60 | PREPARE AND STORE CHARACTER POSITIONING DATA BASED ON TEXT MEMORY |
| S61 | OBTAIN MAXIMUM VALUE OF "PRINT COLOR 1" AND "PRINT COLOR 2" BASED ON CHARACTER POSITIONING DATA, AND SET MAXIMUM VALUE TO PARAMETER CCT |
| S62 | COL ← 0 |
| S63 | COL ≠ CCT ? |
| S64 | INITIALIZING PROCESS OF CHARACTER PARAMETERS<br>CSP ← HEAD ADDRESS<br>CEP ← LAST ADDRESS<br>CC ← 0 |
| S65 | READ OUT DATA CORRESPONDING TO ADDRESS DEFINED BY EQUATION CSP+( CC×10) |
| S66 | PRINT COLOR DEFINED BY VALUE IN PARAMETER COL IS SET READ OUT DATA ? |
| S67 | READ OUT CHARACTER DOT PATTERN INTO DATA DEVELOPING BUFFER |
| S68 | "CHARACTER ( PRINT ) COLOR 1" ? |
| S69 | CHARACTER EMBELLISHING PROCESS |
| S70 | CC ← ( CC+1) |
| S71 | CSP+( CC×10) = CEP ? |
| S72 | EMBELLISHMENT IS BAG FORM, BAG FORM WITH SHADOW OR SEREO FORM ? |
| S73 | PRINT PROCESS |
| S74 | COL ← (COL+1) |
| S75 | TRANSMIT DOT PATTERN IN EMBELLISHING BUFFER TO PRINT BUFFER AND OBTAIN LOGICAL OR OF DOT PATTERN |
| S104 | PROCESS FOR FORMING BLANK PORTION |

F I G. 6 (A)

| S69 | CHARACTER EMBELLISHING PROCESS |
|---|---|
| S80 | READ OUT EMBELLISHMENT DATA FROM EMBELLISHING TABLE AND STORE THEREOF IN MEMORY |
| S81 | SET POINTER AT HEAD POSITION OF EMBELLISHMENT DATA |
| S82 | READ OUT EMBELLISHMENT DATA CORRESPONDING TO POINTER |
| S83 | EMBELLISHMENT DATA ≠ "FFF" ? |
| S84 | THIRD FIGURE = 0 ? |
| S85 | TRANSMIT PRINT DOT PATTERN TO EMBELLISHING BUFFER AND OBTAIN LOGICAL OR OF PRINT DOT PATTERN |
| S86 | TRANSMIT REVERSED PRINT DOT PATTERN TO EMBELLISHING BUFFER AND OBTAIN LOGICAL AND OF PRINT DOT PATTERN |
| S87 | SET POINTER TO NEXT EMBELLISHMENT DATA |

FIG. 7 (A)

| S104 | PROCESS FOR FORMING BLANK PORTION |
|---|---|
| S105 | SEARCH EMBELLISHMENT TABLE, AND READ OUT AND STORE EMBELLISHMENT DATA |
| S106 | SET POINTER AT HEAD POSITION OF EMBELLISHMENT DATA |
| S107 | READ OUT EMBELLISHMENT DATA CORRESPONDING TO POINTER |
| S108 | EMBELLISHMENT FORM HAS BLANK PORTION ? |
| S109 | SET POINTER TO NEXT EMBELLISHMENT DATA |
| S110 | READ OUT EMBELLISHMENT DATA CORRESPONDING TO POINTER |
| S111 | EMBELLISHMENT DATA ≠ "FFF" ? |
| S112 | EMBELLISHMENT WITH BLANK PORTION IS SET ? |
| S113 | TRANSMIT PRINT DOT PATTERN TO EMBELLISHING BUFFER AND OBTAIN LOGICAL OR OF PRINT DOT PATTERN |
| S114 | TRANSMIT REVERSED PRINT DOT PATTERN TO EMBELLISHING BUFFER AND OBAINE LOGICAL AND OF PRINT DOT PATTERN |
| S115 | SET POINTER TO NEXT EMBELLISHMENT DATA |

FIG. 8 (A)

| S2 | PRINT IMAGE DISPLAYING PROCESS |
|---|---|
| S90 | PREPARE CHARACTER POSITIONING DATA BASED ON TEXT MEMORY AND STORE THEREOF |
| S91 | CONVERT X POSITION DATA, Y POSITION DATA AND CHARACTER WIDTH DATA IN CHARACTER POSITIONING DATA FOR DISPLAYING |
| S92 | INITIALIZING PROCESS OF CHARACTER PARAMETERS<br>CSP ← HEAD ADDRESS<br>CEP ← LAST ADDRESS<br>CC ← 0 |
| S93 | READ OUT DATA CORRESPONDING TO ADDRESS DEFINED BY EQUATION CSP + ( CC × 10) |
| S94 | READ OUT CHARACTER DOT PATTERN INTO DATA DEVELOPING BUFFER |
| S95 | CHARACTER EMBELLISHING PROCESS |
| S96 | CC ← ( CC + 1) |
| S97 | CSP + ( CC × 10) = CEP ? |
| S98 | DISPLAY DOT PATTERN IN DISPLAY BUFFER ON LIQUID CRYSTAL DISPLAY |

| FONT | SIZE | EMBELLISHMENT | PRINT COLOR1 | PRINT COLOR2 |
|------|------|---------------|--------------|--------------|
| A | 38P | NORMAL | | NONE |
| B | 26P | EMPHASIS | 2 | 1 |
| C | 19P | BAG | 3 | 2 |
| D | 13P | BAG WITH SHADOW | | 3 |
| | 10P | STEREO | | |
| | 6P | | | |

FIG. 12

| CODE | X POSITION | Y POSITION | CHARACTER WIDTH | FORMAT DATA |
|---|---|---|---|---|
| A | CX1 | CY1 | CW1 | FORMAT DATA |
| B | CX2 | CY2 | CW2 | FORMAT DATA |
| C | CX3 | CY3 | CW3 | FORMAT DATA |
| D | CX4 | CY4 | CW4 | FORMAT DATA |

F I G. 1 4
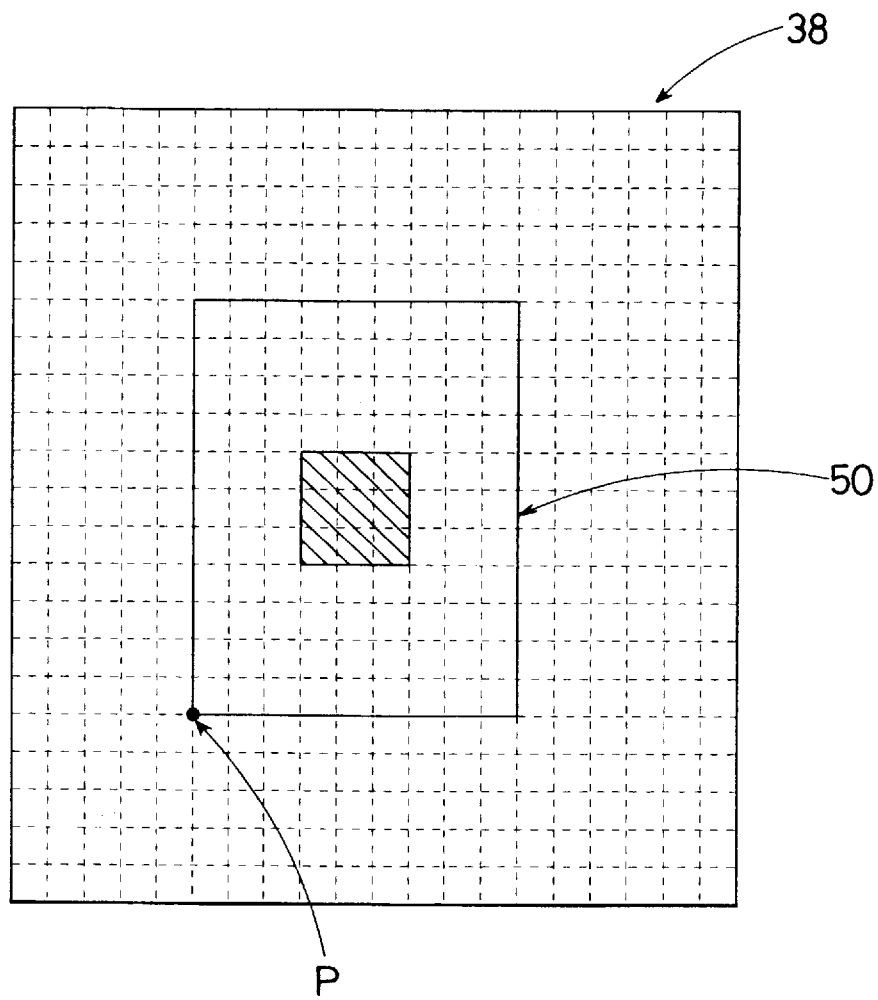

PRINTING APPARATUS CAPABLE OF PRINTING CHARACTER HAVING EMBELLISHMENT WITH BLANK PORTION

BACKGROUND OF THE INVENTION

1. Field of the Invention

The present invention relates to a printing apparatus including a tape printing apparatus, a wordprocessor etc.. In particular, the present invention relates to a printing apparatus which can print characters, each being embellished so as to have an outline portion and a blank portion within the outline portion, the printing apparatus being able to print the outline portion and the blank portion with different color, respectively.

2. Description of Related Art

Conventionally, it is well-known, for example, tape printing apparatuses which can print characters and the like with multi-color on print tapes. By utilizing such tape printing apparatus, as shown in FIG. 23, characters 101, 102, 103, 104 can be printed on a print tape 100, with colors each of which is set to each character 101, 102, 103, 104. And among characters that are printed with multi-color, there exist not only normal characters 101, 104 but also characters variously embellished such as characters 102, 103. Especially, when printing characters 102, 103 embellished so as to have outline portions 102A, 103A and blank portions 102B, 103B within the outline portions 102A, 103A, the outline portions 102A, 103A are only printed with colors each of which is set to each character 102, 103.

Here, concerning with the embellished characters 102, 103, if the outline portions 102A, 103A and the blank portions 102B, 103B can be respectively printed with different color, it can obtain clear contrast between the outline portions 102A, 103A and the blank portions 102B, 103B, based on that different color is used for the outline portions 102A, 103A and the blank portions 102B, 103B, respectively. Therefore, outward appearance of the embellished characters 102, 103 can be remarkably improved.

However, in the above conventional tape printing apparatuses, since one color is set to one character and character is printed with the color only set therefor, the outline portions 102A, 103A and the blank portions 102B, 103B cannot be printed with different color. Thus, outward appearance of the embellished characters cannot be so improved.

SUMMARY OF THE INVENTION

Accordingly, it is an object of the present invention to dissolve the above problems of the conventional printing apparatuses and to provide a printing apparatus which can respectively print outline portions and blank portions in characters with different color, each character being embellished so as to have the outline portion and the blank portion within the outline portion, thereby outward appearance of the embellished characters can be remarkably improved.

To accomplish the above object, the present invention provides a printing apparatus comprising:

input means for inputting character;

embellishment means for selectively embellishing the character input by the input means in a first form that the character is embellished so as to have an outline portion and a blank portion;

color set means for setting among various colors a first print color and a second print color to the character embellished by the embellishment means; and print means for printing the embellished character so that the outline portion is printed with the first print color and the blank portion is printed with the second print color.

According to the invention claimed in claim 1, the character input by the input means is selectively embellished in the first form that the character is embellished so as to have the outline portion and the blank portion. And further, the first print color and the second print color are set to the embellished character through the color set means. Thereafter, when the character is printed by the print means, the outline portion is printed with the first print color and the blank portion is printed with the second print color. Therefore, since the outline portion and blank portion in the character are printed with different color, respectively, outward appearance of the character is remarkably improved.

And the present invention provides a tape printing apparatus for preparing print tape on which character is printed, the tape printing apparatus comprising:

input means for inputting the character;

embellishment means for selectively embellishing the character input by the input means in a first form that the character is embellished so as to have an outline portion and a blank portion;

color set means for setting among various colors a first print color and a second print color to the character embellished by the embellishment means; and thermal print mechanism for thermally printing the embellished character so that the outline portion is printed with the first print color and the blank portion is printed with the second print color on the print tape.

According to the tape printing apparatus claimed in claim 17, similarly to the above, the character input by the input means is selectively embellished in the first form that the character is embellished so as to have the outline portion and the blank portion. And further, the first print color and the second print color are set to the embellished character through the color set means. Thereafter, when the character is printed by the thermal print mechanism, the outline portion is printed with the first print color and the blank portion is printed with the second print color on the print tape. Therefore, since the outline portion and blank portion in the character are printed with different color, respectively, it can realize the tape printing apparatus in which outward appearance of the character is remarkably improved.

The above and further objects and novel features of the invention will more fully appear from the following detailed description when the same is read in connection with the accompanying drawings. It is to be expressly understood, however, that the drawings are for purpose of illustration only and not intended as a definition of the limits of the invention.

BRIEF DESCRIPTION OF THE DRAWINGS

The printing apparatus according to the present invention will be described with reference to the following drawings, wherein:

(FIG. 2A is a table identifying the blocks of FIG. 2)

(FIG. 3A is a table identifying the blocks of FIG. 3)

(FIG. 4A is a table identifying the blocks of FIG. 4)

(FIG. 5A is a table identifying the blocks of FIG. 5)

(FIG. 6A is a table identifying the blocks of FIG. 6)

(FIG. 7A is a table identifying the blocks of FIG. 7)

(FIG. 8A is a table identifying the blocks of FIG. 8)

FIG. 12 is a schematic view for explaining data construction of character positioning data in a character positioning data storing area in a RAM;

FIG. 14 is an image view of an embellishing buffer when dot pattern is transmitted, while conducting the character embellishing program in the tape printing apparatus;

DETAILED DESCRIPTION OF THE PREFERRED EMBODIMENTS

A detailed description of the preferred embodiment of the tape printing apparatus embodying the present invention will now be given referring to the accompanying drawings.

Figure 20:
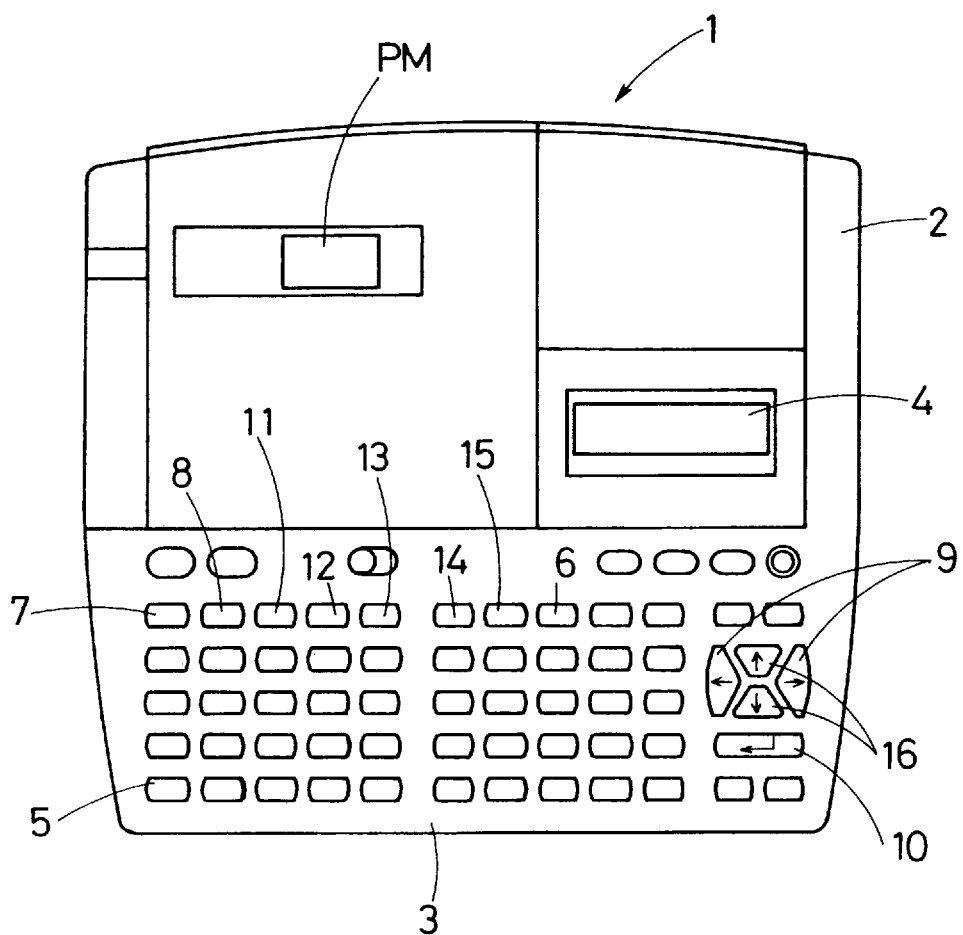
FIG. 20 is a plan view of the tape printing apparatus.

In the embodiment, the printing apparatus of the present invention is embodied as a tape printing apparatus (hereinafter, abbreviated as "tape printer") 1 shown in FIG. 20. For instance, in FIG. 1, the tape printer 1 can print normal characters 101, 104 with normal embellishment and characters 102, 103 embellished so as to have blank portions 102B, 103B on a print tape 100. In particular, concerning with the embellished characters 102, 103, the tape printer 1 can print them so that outline portions 102A, 103A and the blank portions 102B, 102B are printed on the print tape 100 with different color, respectively.

Next, the construction of the tape printer 1 will described with reference to FIG. 20. In FIG. 20, at a front part of a main body 2 in the tape printer 1, a keyboard 3 is arranged, and a thermal print mechanism PM is arranged in the main body 2 at the rear position of the keyboard 3. At the right rear position of the key board 3, it is positioned a liquid crystal display 4 on which characters such as letters, numerals input from the keyboard 3 are displayed.

On the keyboard 3, there are arranged various keys necessary for operation of the tape printer 1, as described hereinafter. For instance, on the keyboard 3, there are arranged character keys 5 to input various characters such as letters, numerals, a range setting key 6 utilized when the range within which background pattern such as mesh pattern is added behind the characters is set, a format setting key 7 to set the kind of frame added around the characters, a print key 8 to conduct printing of the characters, etc., a right and left key 9 to move a cursor rightward and leftward on the liquid crystal display 4, a return key 10 to conduct various procedures, a ruled line key 11 to select the kind of background pattern, a size key 12 to set the size of characters, a font key 13 to set the font of characters such as Gothic, an embellishing key 14 to set character embellishment such as the bag form, the bag form with shadow, stereo form, etc., a cancel key 15 to cancel various procedures, an up and down key 16 to move the cursor upward and downward on the liquid crystal display 4 and the other keys necessary for the tape printer 1.

Figure 21:
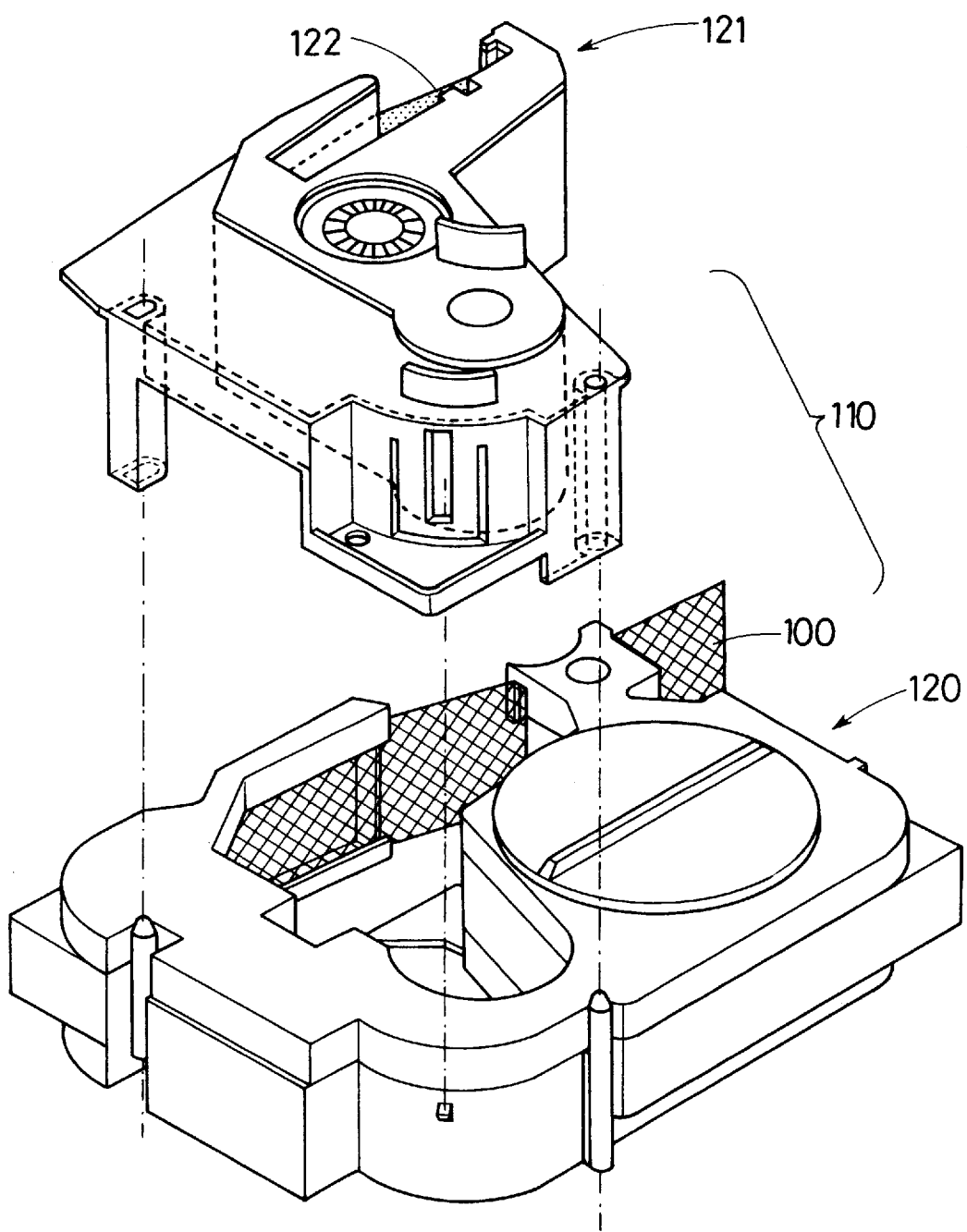
FIG. 21 is a perspective view of a tape cassette utilized in the tape printing apparatus.

As shown in FIG. 21, the tape cassette 110, which is detachably mounted in the thermal print mechanism PM, is constructed from a print tape part 120 in which the print tape 110 is wound and a ribbon part 121 in which a color ribbon 122 is wound. And when characters are printed on the print tape 100 by the thermal print mechanism PM, multi-color printing can be conducted by exchanging the ribbon part 121 with an other ribbon part 121 in which a color ribbon 122 with different color is wound. Concerning with multi-color printing, the construction to conduct the same multi-color printing is described in detail in U.S. patent application Ser. No. 08/617,058, Japanese Patent Application, laid-open number Hei 7-100,069, Japanese Patent Application, laid-open No. Hei 8-267,883. Therefore, detailed description of the multi-color printing is omitted.

Figure 22:
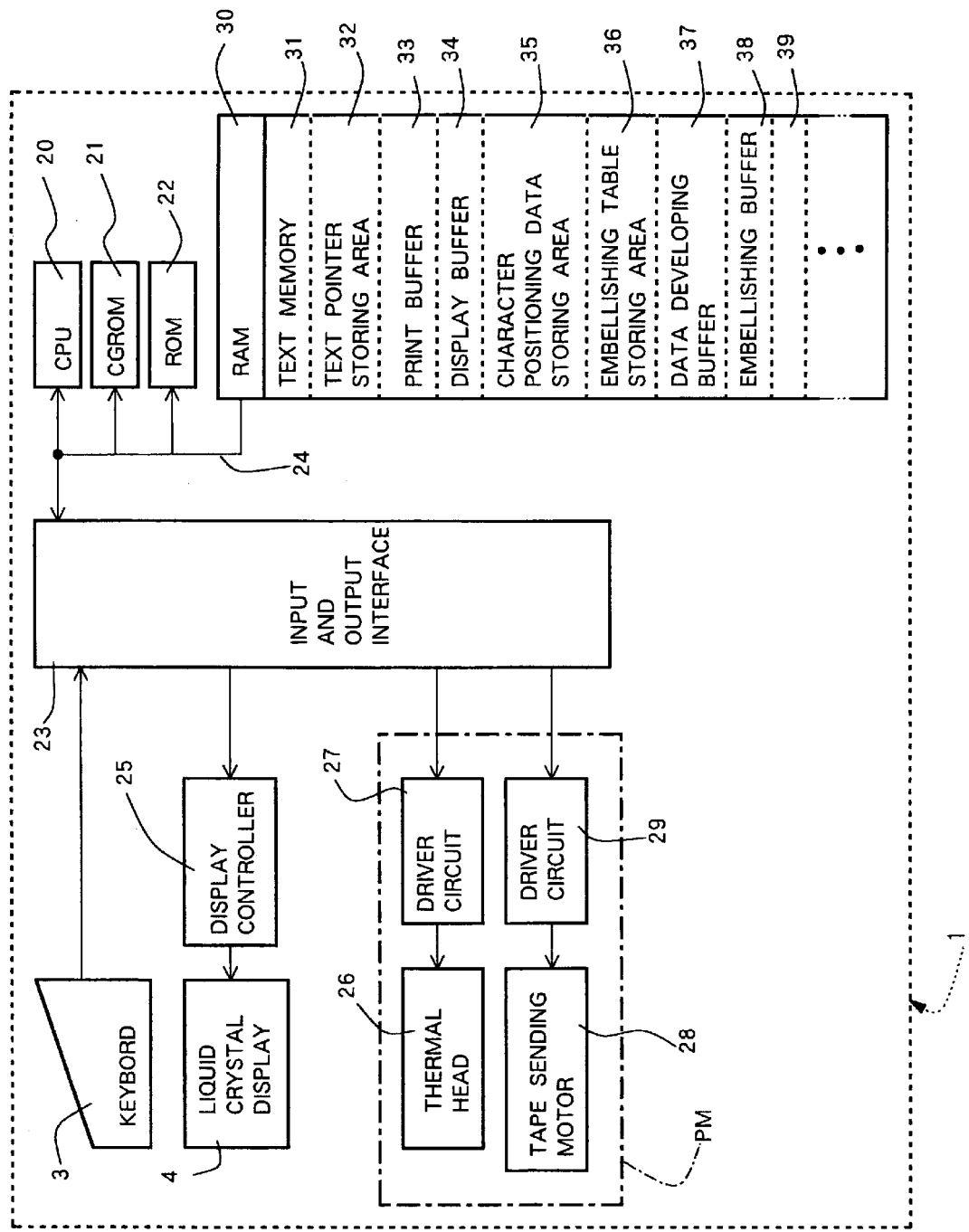
FIG. 22 is a block diagram for explaining electric construction of the tape printing apparatus.
Figure 23:
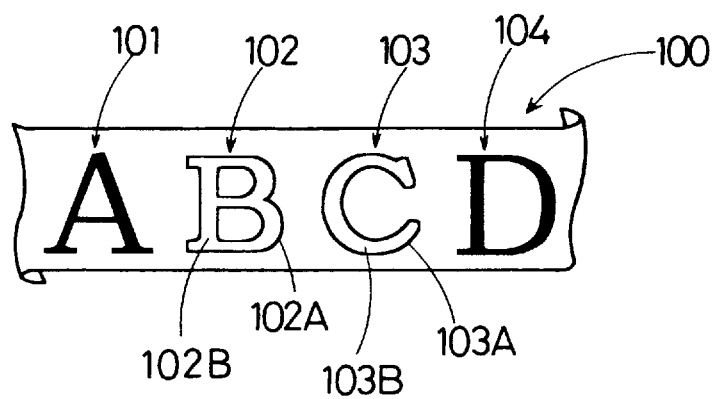
FIG. 23 is a plan view of the tape on which the normal character and the embellished character having the blank portion are printed with multi-color by the conventional tape printing apparatus.

Hereinafter, electric construction of the tape printer 1 will be described with reference to the block diagram shown in FIG. 22. To CPU 20 controlling operation of the tape printer 1, CGROM 21, ROM 30, input and output interface 23 are connected through bus line 24. In the CGROM 21, dot patterns corresponding to characters, numerals, etc. and dot pattern date for printing are stored.

Figure 2:
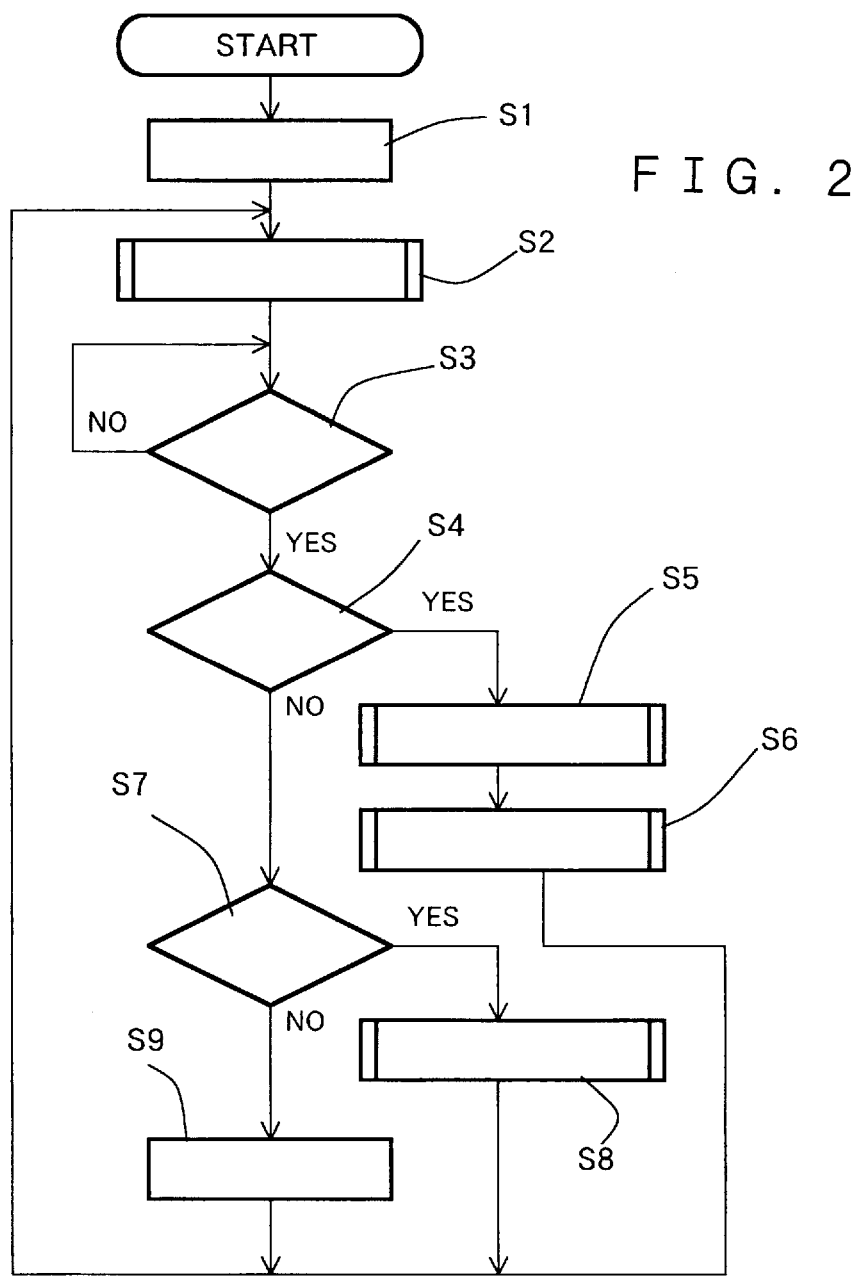
FIG. 2 is a flowchart to conduct main program in the tape printing apparatus.
Figure 3:
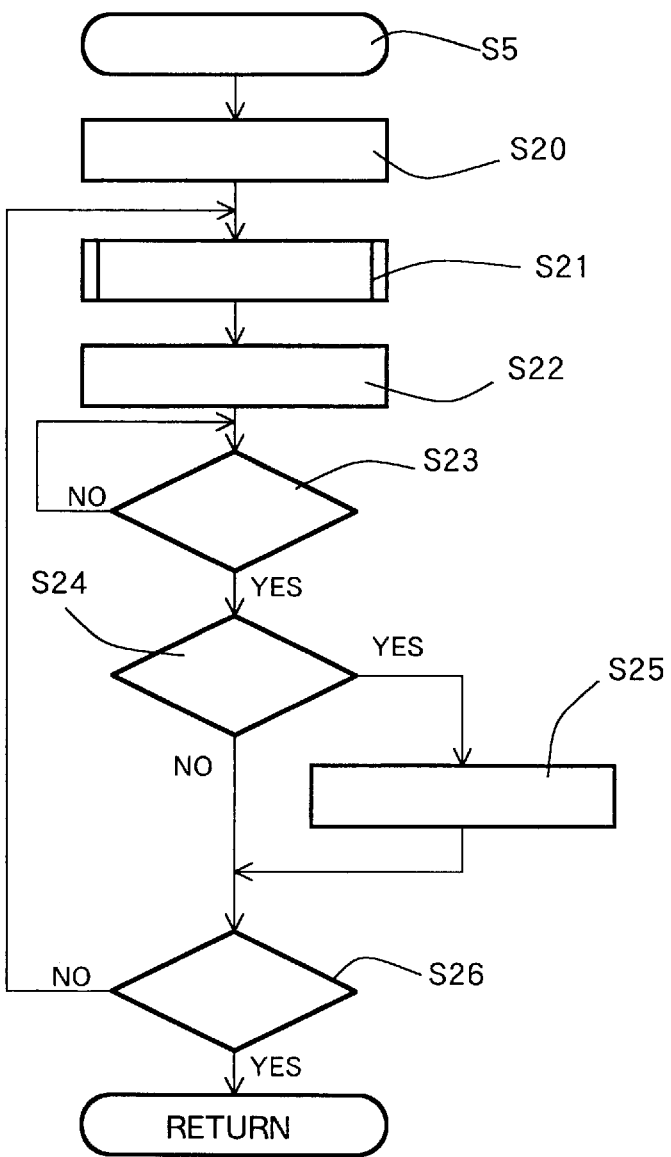
FIG. 3 is a flowchart to conduct range setting program in the tape printing apparatus.
Figure 4:
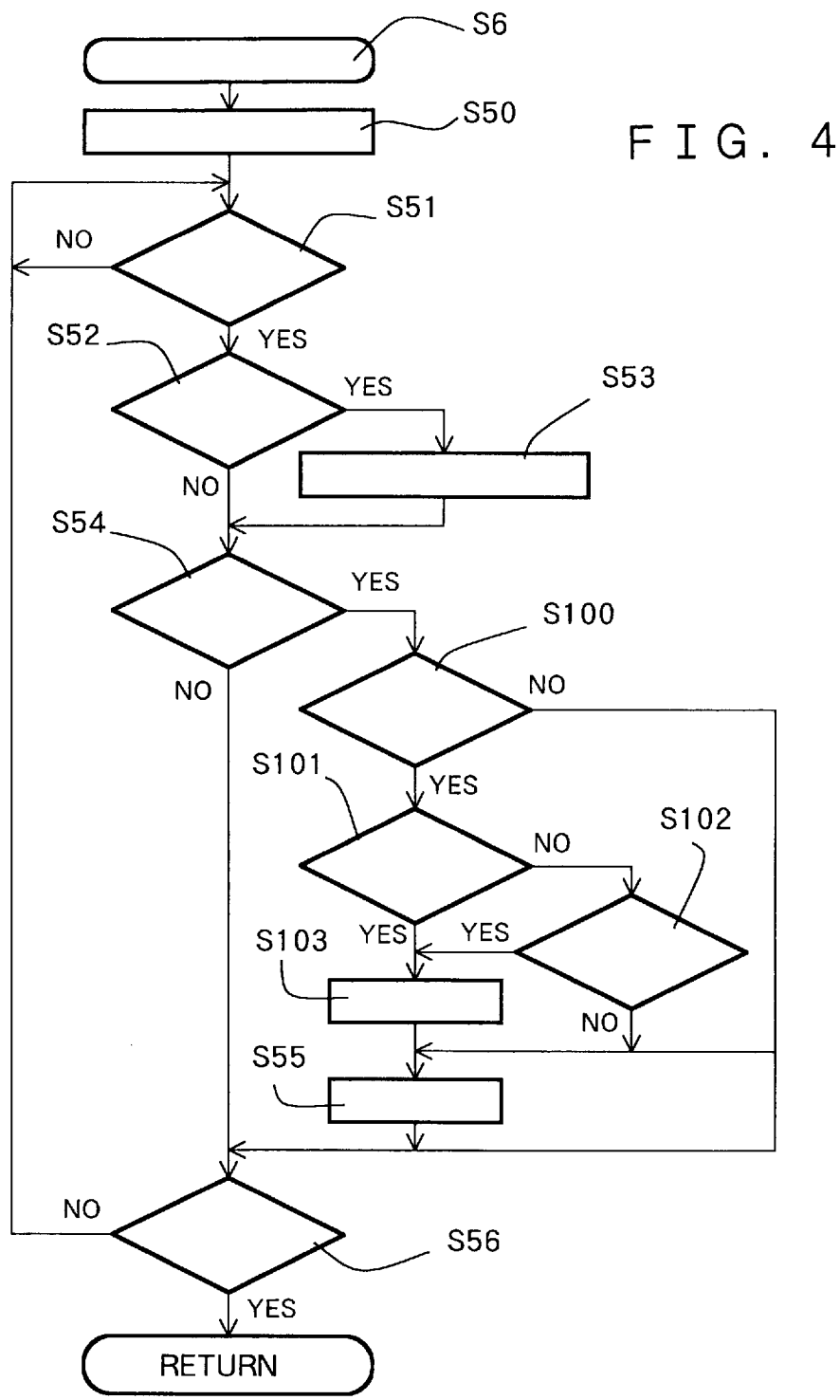
FIG. 4 is a flowchart to conduct format changing program in the range set by the range setting program, in the tape printing apparatus.
Figure 5:
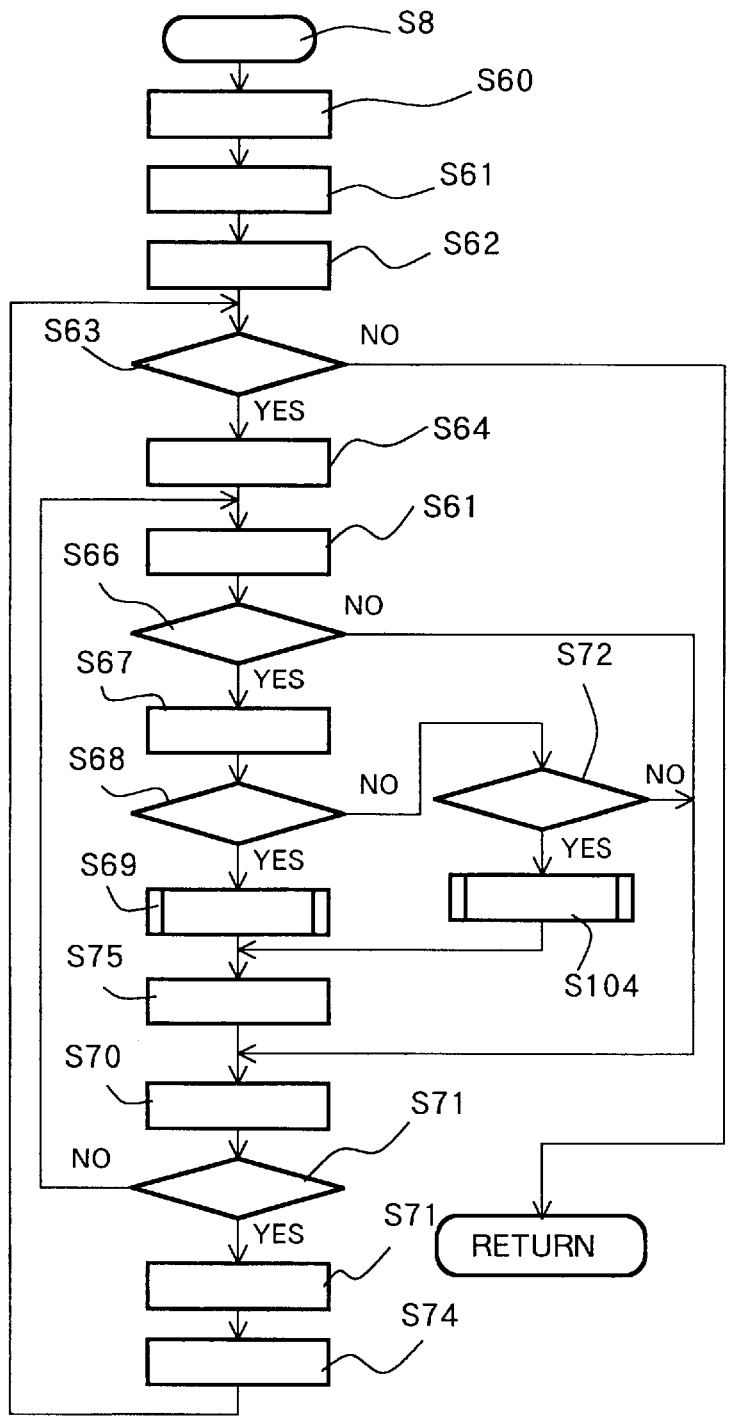
FIG. 5 is a flowchart to conduct printing program in the tape printing apparatus.
Figure 6:
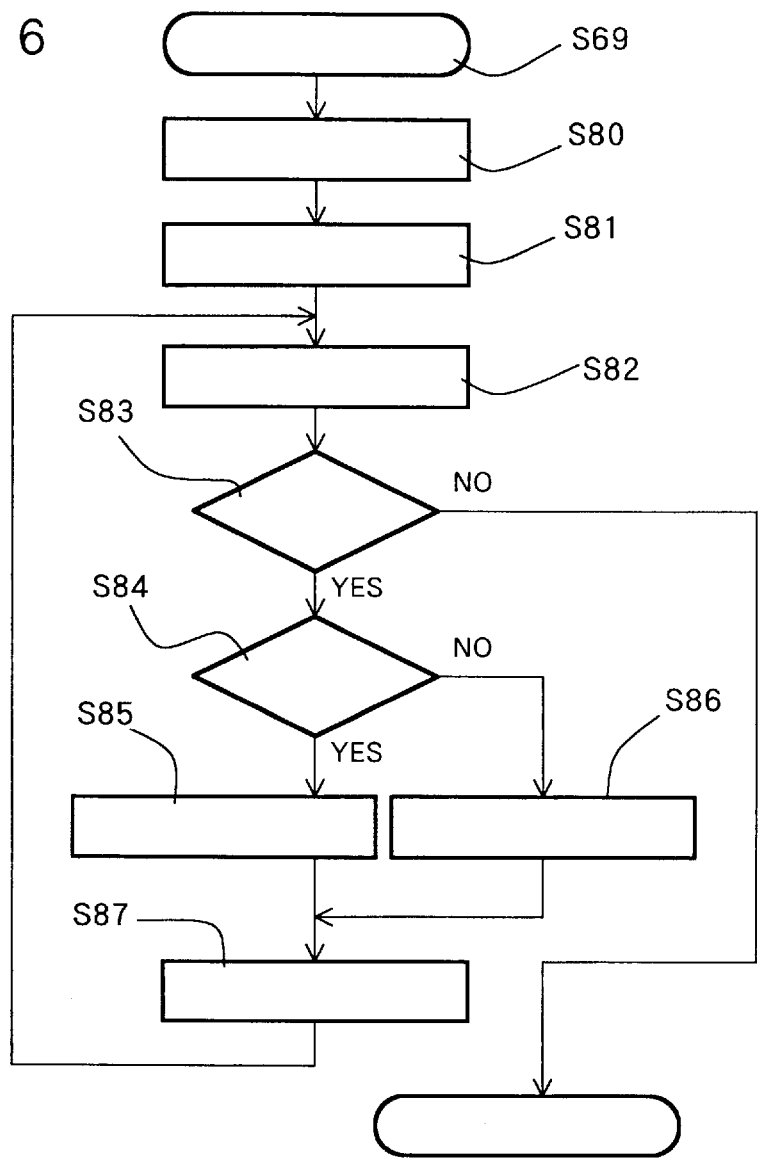
FIG. 6 is a flowchart to conduct character embellishing program in the tape printing apparatus.
Figure 8:
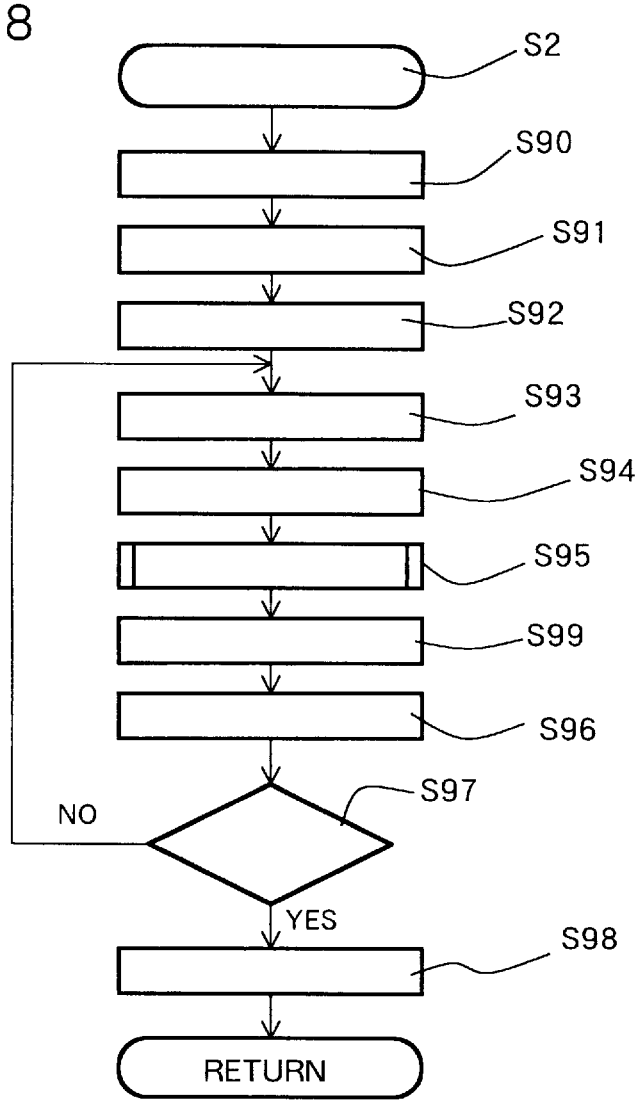
FIG. 8 is a flowchart to conduct image displaying program in the tape printing apparatus.
Figure 13:
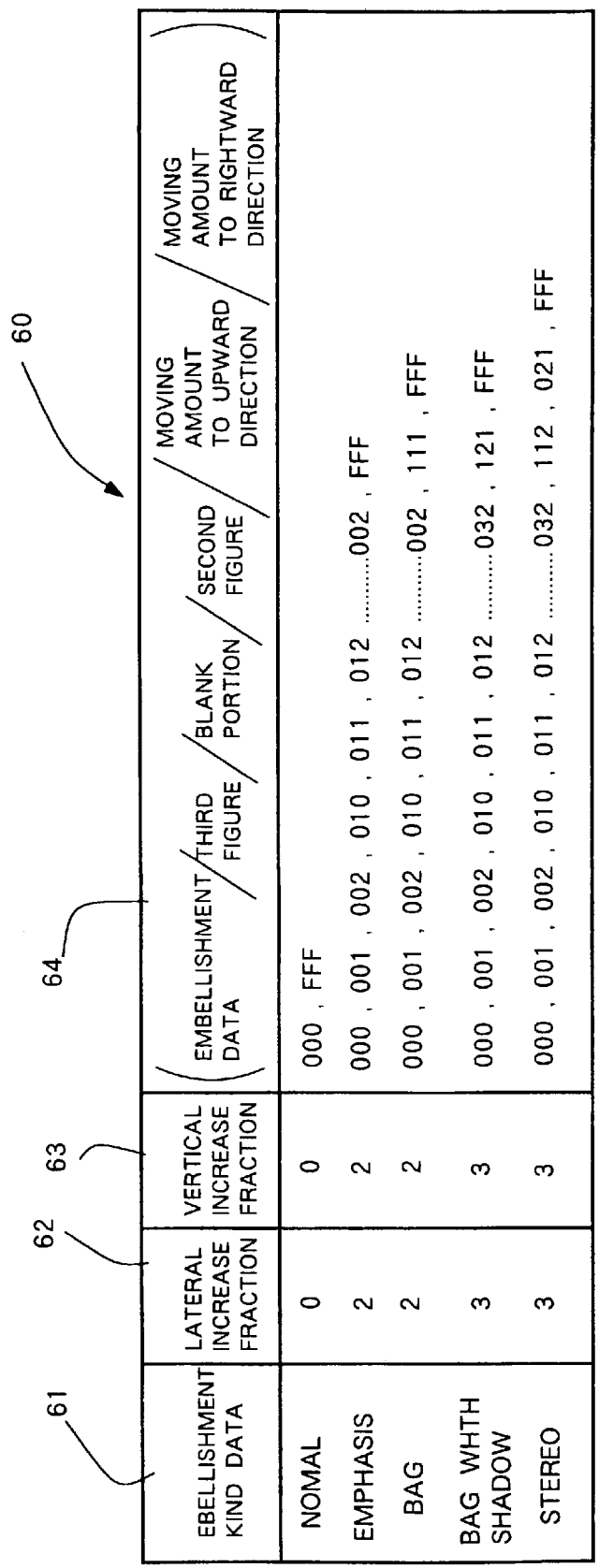
FIG. 13 is a schematic view for explaining data construction in an embellishing table stored in an embellishing table storing area in the RAM.

In the ROM 22, there are stored various programs such as main program shown in FIG. 2, range setting program shown in FIG. 3, format changing program within the range set by the range setting program shown in FIG. 4, printing program shown in FIG. 5, character embellishing program shown in FIG. 6, image displaying program shown in FIG. 8, and the other programs necessary for operation of the tape printer 1 and embellishing table 6 shown in FIG. 13 are stored in the ROM 22. The RAM 30 is memory area utilized when the CPU 20 conducts the above various programs. In the RAM 30, various memories are formed as shown in FIG. 22. For example, text memory 31, text pointer storing area 32, print buffer 33 constructed from image buffer, display buffer 34, character positioning data storing area 35, embellishing table storing area 36, data developing buffer 37, embellishing buffer 38 and the other memory areas 39 are formed in the RAM 30.

Figure 1:
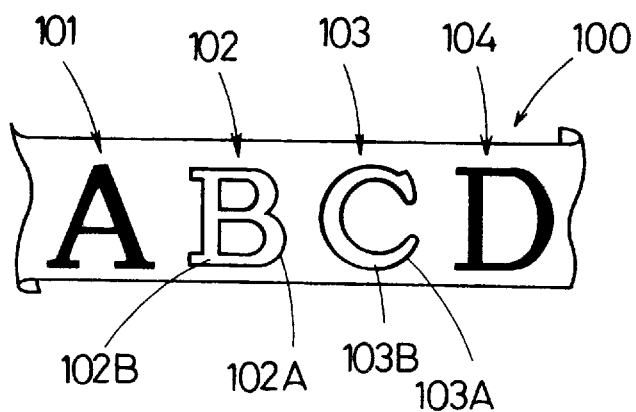
FIG. 1 is a plan view showing a printed tape on which normal characters and embellished characters, each having an outline portion and a blank portion, printed by a tape printing apparatus according to the preferred embodiment of the present invention.
Figure 11:
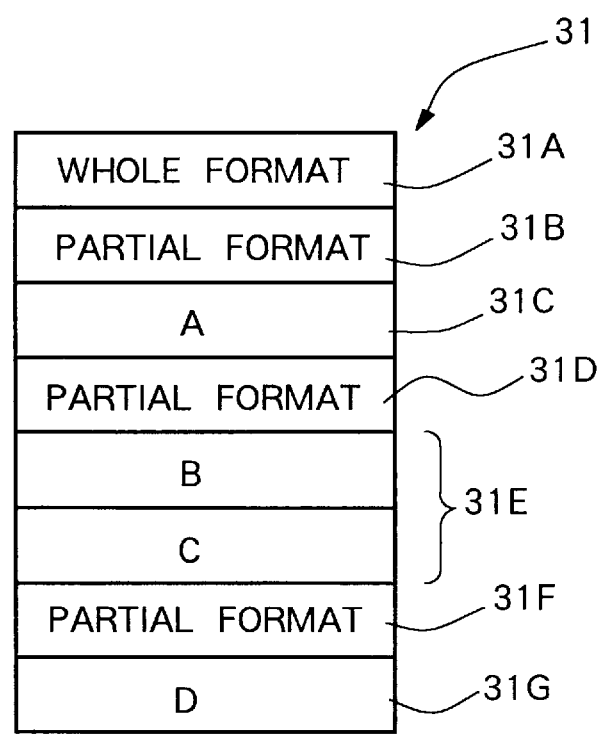
FIG. 11 is a schematic view for explaining data construction in a text memory of the tape printing apparatus.

Here, the text memory 31 stores the format data of text (text data) and code data corresponding to the characters input from the keyboard 3. For instance, when the characters 101, 102, 103, 104 (each corresponding to character A, B, C and D, respectively as shown in FIG. 1) are input through the character key 5 on the key board 3, and the character 101 (character A), the character 104 (character D) are set to the normal characters and further the character 102 (character B), and the character 103 (character C) are set to the embellished characters with the blank portions 102B, 103B, there will be stored, as shown in FIG. 11, in the text memory 31 the whole format 31A having format data of whole text, the partial format 31B having format data of the character 101 (character A), the code data 31C of the character 101, the partial format 31D having format data of both the characters 102, 103 (characters B, C), the code data 31E of the characters 102, 103, the partial format 31F having format data of the character 104 (character D) and the code data 31G of the character 104. In particular, in each partial format 31B, 31D, 31F, the size, embellishment, color, etc. of each character are stored. Further, in the text pointer storing area 32, the pointer is stored to serially point the whole format 31A and partial format 31B stored in the text memory 31.

To the print buffer 33, the data read out from the CGROM 21 based on the text memory 31 is transmitted and stored therein. And the thermal head 26 conducts dot printing according to the data stored in the print buffer 33. Further, to the display buffer 34, the data read out from the CGROM 21 based on the text memory 31 is transmitted and stored therein. The liquid crystal display 4 displays the characters thereon according to the data stored in the display buffer 34.

The character positioning data storing area 35 is utilized as a memory to store the character positioning data made in the printing process in FIG. 5. Here, the character positioning data will be explained with reference to FIG. 12. The character positioning data 40 is constructed from code data 41 corresponding to each character, X position data 42 and Y position data 43 used for directing each character position, character width data 44 corresponding to each character width and format data 45 corresponding to various data concerning with each character. Specifically, the format data 45 includes information for each character about whether embellishment is added to or not, and what print color is set to. For example, in FIG. 12, it is shown the character positioning data 40 when the characters A, B, C and D (corresponding to the characters 101, 102, 103, 104 in FIG. 1, respectively) are input through the character key 5 on the keyboard 3. The numeral added to the left side of character positioning data 40 means the address number 46.

The embellishing table storing area 36 is utilized as a memory to store the data of embellishing table 60 which is used in the character embellishing process in FIG. 6. Here, the embellishing table 60 will be described according to FIG. 13. The embellishing table 60 is constructed from embellishment kind data 61, lateral increase fraction data 62, vertical increase fraction data 63 and embellishment data 64.

Figure 18:
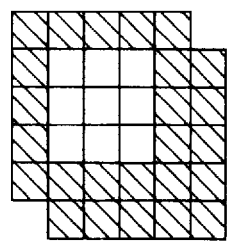
FIG. 18 is a schematic view showing dot pattern when the character is embellished to a bag form with shadow.
Figure 19:
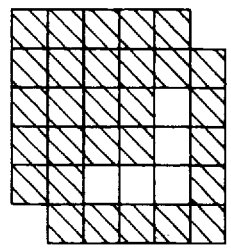
FIG. 19 is a schematic view showing dot pattern when the character is embellished to a stereo form.

Here, the embellishment kind data 61 represents what kind of embellishment is added to the character. For example, in case that it is considered a dot pattern constructed 3×3 dots as shown in FIG. 15, the dot pattern in normal form embellishment becomes the dot pattern shown in FIG. 15, the dot pattern in emphasis form embellishment becomes the dot pattern shown in FIG. 16, the dot pattern in bag form embellishment becomes the dot pattern shown in FIG. 17, the dot pattern in bag form with shadow embellishment becomes the dot pattern shown in FIG. 18 and the dot pattern in stereo form embellishment becomes the dot pattern shown in FIG. 19.

Figure 15:
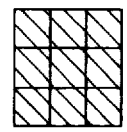
FIG. 15 is a schematic view showing dot pattern of the normal character.
Figure 16:
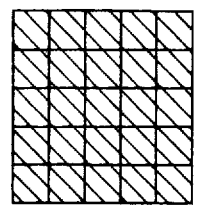
FIG. 16 is a schematic view showing dot pattern when the character is embellished to an emphasis form.

The lateral increase fraction data 62 is defined by dot number in lateral direction on embellishing data area, based on the data area of normal embellishment in FIG. 15. Similarly, the vertical increase fraction data 63 is defined by dot number in vertical direction on embellishing data area. And embellishment data 64 is utilized when the dot pattern in each embellishment form is prepared from the dot pattern of normal embellishment. Since preparation of the dot pattern in each embellishment form is conducted in the character embellishing process in FIG. 6, the detailed description thereof will be briefly given hereinafter.

Figure 17:
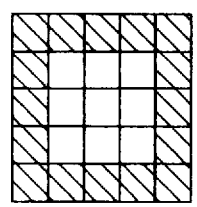
FIG. 17 is a schematic view showing dot pattern when the character is embellished to a bag form.

For instance, when the dot pattern in the bag form embellishment in FIG. 17 is prepared from the dot pattern in the normal embellishment in FIG. 15, at first, the dot pattern in FIG. 15 which is developed in the data developing buffer 37 is transmitted to the embellishing buffer 38 as shown in FIG. 14, based on the data "000" positioned at the head of embellishment data 64. Here, the transmitted position of the dot pattern data becomes standard position when data transmitting is done. Next, based on the data "001" positioned at the second position in the embellishment data 64, the dot pattern of the normal embellishment in FIG. 15 is transmitted to the embellishing buffer 38, so that the lower left corner point P of the data area 50 (see FIG. 14) is positioned at the position where the point P is shifted to the right direction by one dot. And logical OR is obtained from the dot pattern shifted according to the above and the dot pattern already transmitted to the embellishing buffer 38. That is to say, in the embellishment data 64, the value at the first figure represents the moving amount of the dot pattern data to the right direction when the data area 50 of the dot pattern of normal form is transmitted to the embellishing buffer 38. Further, based on the third data "002" in the embellishment data 64, the dot pattern of the normal embellishment in FIG. 15 is transmitted to the embellishing buffer 38, so that the lower left corner point P of the data area 50 (see FIG. 14) is positioned at the position where the point P is shifted to the right direction by two dots. And logical OR is obtained from the dot pattern shifted according to the above and the dot pattern already transmitted to the embellishing buffer 39.

Next, based on the fourth data "010" in the embellishment data 64, the dot pattern of the normal embellishment in FIG. 15 is transmitted to the embellishing buffer 38, so that the lower left corner point P of the data area 50 (see FIG. 14) is positioned at the position where the point P is shifted to the upward direction by one dot. And logical OR is obtained from the dot pattern shifted according to the above and the dot pattern already transmitted to the embellishing buffer 38. That is to say, in the embellishment data 64, the value at the second figure represents the moving amount of the dot pattern data to the upward direction when the data area 50 of the dot pattern of normal form is transmitted to the embellishing buffer 38. Thereafter, similarly to the above, the dot pattern data of the normal embellishment in FIG. 15 is transmitted to the embellishing buffer 38.

Further, as the final transmitting, based on the data "111" positioned before the last data "FFF" in the embellishment data 64, the dot pattern of the normal embellishment in FIG. 15 is transmitted to the embellishing buffer 38 after the dot pattern data is reversed, so that the lower left corner point P of the data area 50 (see FIG. 14) is positioned at the position where the point P is shifted to both the right direction and the upward direction by one dot. And logical AND is obtained from the dot pattern shifted according to the above and the dot pattern already transmitted to the embellishing buffer 38. That is to say, in the embellishment data 64, the value at the third figure represents that the dot pattern data of the normal embellishment is reversed and the logical AND is obtained, the dot pattern of the normal embellishment is transmitted to the embellishing buffer 38.

As mentioned above, the dot pattern of the normal embellishment in FIG. 15 becomes the dot pattern with the bag form embellishment in FIG. 17, after the logical AND is obtained on the embellishing buffer 38. The data area of the dot pattern with the bag form embellishment becomes wider by two dots in both the vertical direction and lateral direction than the data area 50 of the dot pattern with the normal embellishment.

Here, returning to FIG. 2, explanation of the tape printer 1 will be continued. The data developing buffer 37 is utilized for developing the dot pattern data stored in the CGROM 21 or the dot pattern data for printing, before such data is transmitted to the print buffer 33 or the display buffer 34. The embellishing buffer 38, as mentioned above, is utilized for preparing the dot pattern data with various embellishment from the dot pattern data with the normal embellishment.

And to the input and output interface 30, the keyboard 3, the display controller 25 and the thermal printing mechanism PM are connected. Thus, when the characters are input from the character key 5 on the keyboard 3, the dot pattern corresponding to the input characters is displayed on the liquid crystal display 4 through the display controller 25, based on the print image displaying program shown in FIG. 8 (later mentioned). Further, in the thermal printing mechanism PM, the thermal head 26 is driven through the driver circuit 27 based on the printing program shown in FIG. 5 (later mentioned), thereby the print data stored in the print buffer 33 is printed on the print tape 100. Synchronously with printing operation, the tape sending motor 28 is driven through the driver circuit 44, thereby tape sending operation of the print tape 100 is controlled.

Following to the above, operation of the tape printer 1 constructed according to the above will be described with reference to FIGS. 2–19. FIG. 2 shows the flowchart of main program conducted in the tape printer 1, and the main program includes the range setting program to set the range for embellishment and the format changing program within the range set by the range setting program to set the print color for characters.

First, in step (abbreviated as "S" hereinafter) 1, initialization is conducted over the tape printer 1. In S2, the print image displaying process in FIG. 8 is done. Here, the print image displaying process means the process to display the pint image, which is printed on the print tape 100, on the liquid crystal display 4. This process will be described later.

In S3, it is judged whether key input from any key on the keyboard 3 is done or not. If it is judged in S3 that key input is done from the key on the keyboard 3 (S3:YES), procedure shifts to S4. On the other hand, if it is judged in S3 that key input is not done (S3:NO), procedure returns to S3 and waits until key input is done form the keyboard 3. In S4, it is judged whether key input is done form the range setting key 6. If judged that key input is done from the range setting key 6 (S4:YES), procedure shifts to S5 in which the range setting process is conducted.

The range setting process conducted in S5 is the process to set the range of characters each of which is embellished so as to be constructed from the outline portion and the blank portion. It will be described hereinafter the range setting process according to FIG. 3. In S20, the head position of the range and the last position thereof are set to the present cursor position displayed on the liquid crystal display 4 and both head and last positions are stored in the partial format storing area, which corresponds to each character, of the text memory 31. In S21, the print image displaying process is conducted, similarly in S2. In S22, the characters existing within the range defined by the head position and last position are reversely displayed on the liquid crystal display 4.

In S23, it is judged whether key input is done by any key on the keyboard 3. If judged that key input is done from the keyboard 3 (S23:YES), procedure shifts to S24. Contrarily, if judged in S23 that none of key input is done from the keyboard 3 (S23:NO), procedure again returns to S23 and waits until key input is done from the key board 3.

Figures 9, 10:
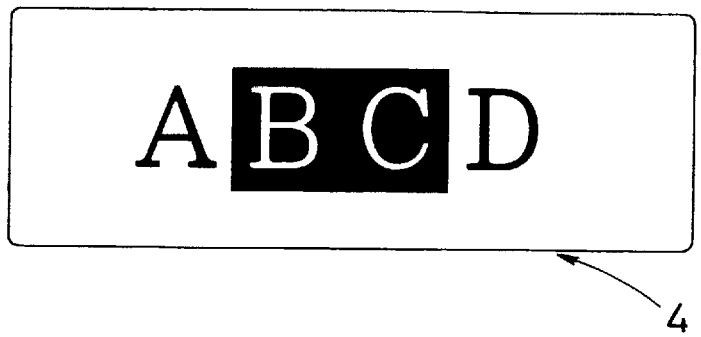
FIG. 9 is a plan view of a liquid crystal display on which, for example, characters are reversely displayed, while conducting the range setting program in the tape printing apparatus.
FIG. 10 is a plan view of the liquid crystal display on which format setting information is schematically displayed, while conducting the format changing program in the tape printing apparatus.

In S24, it is judged whether key input is done by the right and left key 9 on the keyboard 3. If judged key input is done by the right and left key 9 (S24:YES), both the head position and last position of the range are changed according to the cursor position movement based on key input from the right and left key 9, and both the head and last positions are stored in the partial format storing area 31D, thereby the embellishing range is set (S25). Thereafter, procedure shifts to S26. For example, in case that the characters A, B, C and D are already input by the character key 5 and the cursor is moved form the character B to the character C in S24, the characters B and C are reversely displayed on the liquid crystal display 4 while the characters A and D are not reversed, as shown in FIG. 9.

And if judged that key input is not done by the right and left key 9 (S24:NO), procedure directly shifts to S26. In S26, it is judged whether key input is done by the return key 10. If judged that key input is done by the return key 10 (S26:YES), procedure shifts to S2 in FIG. 2. On the other hand, if judged that key input is not done by the return key 10 (S26:NO), procedure returns to S 21.

As mentioned above, if judged in S26 that key input is done by the return key 10 (S26:YES), procedure shifts to S6 in the main program in FIG. 2. Here, in S6, the format changing process within the range set according to the above is conducted. The format changing process is the process that various formats (for example, size, embellishment, print color of each character) are stored and set in the partial format storing area in the text memory 31. It will be described hereinafter the format changing process conducted in S6.

First, in S 50, the format setting information is displayed on the liquid crystal display 4. Here, on the liquid crystal display 4, the format setting information, which is presently set in the partial format storing area of the text memory 31, is partially displayed as shown in FIG. 10. In FIG. 10, the item "font" is used for setting the character font such as Gothic, etc., and in case of FIG. 10 four character fonts A–D are able to be set. Concretely, it is indicated in FIG. 10 that the character font A is set. Further, similarly to the above, the items "size", "embellishment", "character color 1" and "character color 2" are displayed on the liquid crystal display 4.

In the item "size", the character size can be set by point numeral. In the item "embellishment", two kinds of embellishment (one is the normal embellishment and the other is the embellishment in which the character is constructed from the outline portion and the blank portion) can be set. Here, as the normal embellishment, it can be set one of the normal embellishment and the emphasis embellishment. And as the embellishment with the outline portion and blank portion, it can be set one of the bag form embellishment, the bag form embellishment with shadow and the stereo form embellishment. Further, in the item "character color 1", color of the character with the normal embellishment and color of the outline portion of the character embellished with the outline portion and the blank portion can be set by numeral 1–3. In the item "character color 2", the blank portion of the character embellished with the outline portion and the blank portion can be set by numeral 1–3. Here, the numeral 1–3 is also used with the same meaning (that is, the same color) for the parameter COL in the printing process in FIG. 5, as mentioned later.

In S51, it is judged whether key input is done by any key on the keyboard 3. If judged that key input is done from the keyboard 3 (S51:YES), procedure shifts to S52. On the other hand, if judged that none of key input is done from the keyboard 3 (S51:NO), procedure repeats judgement in S51 until key input is done from the keyboard 3.

In S52, it is judged whether key input is done by the right and left key 9 on the keyboard 3. If judged that key input is done by the right and left key 9 (S52:YES), the cursor is moved on the liquid crystal display 4 according to key input from the right and left key 9 in S53, thereafter procedure shifts to S54 For instance, on the liquid crystal display 4 displaying the format setting information, if key input is done by the right key 9, the cursor is moved to the right direction. Thereby, The size "38P" is reversely displayed instead of the character font "A". If judged that none of key input is done by the right and left key 9 (S52:NO), procedure directly shifts to S54.

In S54, it is judged whether key input is done by the up and down key 16. If judged that key input is done by the up and down key 16 (S54:YES), it is judged in S100 whether the cursor is positioned on the "character color 2". If judged that the cursor is not positioned on the "character color 2" (S100:NO), procedure shifts to S55. On the other hand, if judged that the cursor is positioned on the "character color 2" (S100:YES), it is further judged in S101 whether the normal embellishment or the emphasis embellishment is set as the character embellishment. If judged that the character embellishment is set to the normal embellishment or the emphasis embellishment (S101;YES), "none" is displayed on the "character color 2". Contrarily, if judged that the character embellishment is not set to the normal embellishment or the emphasis embellishment (S101:NO), it is judged in S102 whether the numeral displayed on the "character color 2" is as same as the numeral on the "character color 1". If the numeral on the "character color 2" is as same as the numeral on the "character color 1" (S102;YES), procedure shifts to S103. And if judged that the numeral on the "character color 2" is not as same as the numeral on the "character color 1" (S102;NO), procedure shifts to S55.

As mentioned above, in S100–S103, since the character with the normal embellishment does not have the blank portion, "none" is displayed on the "character color 2" when one of the normal embellishment and the emphasis embellishment is set, and setting of the "character color 2" is canceled. Further, when the same numeral is set to both the "character color 1" and the "character color 2", "none" is displayed on the "character color 2" when one of the normal embellishment and the emphasis embellishment is set, and setting of the "character color 2" is canceled. Here, in FIG. 1, the characters 101, 104 correspond to characters with the normal embellishment and the characters 102, 103 correspond to characters with the bag form embellishment.

In S55, the formats reversely displayed on the liquid crystal display 4 are changed and the changed formats are stored in the partial format storing area 31D of the text memory 31, thereafter procedure shifts to S56.

For example, on the liquid crystal display 4 displaying the format setting information in FIG. 10, when "38P" is reversely displayed on the "size" and key input is done by the down key 16, "26P" is displayed instead of "38P" and the data of "26P" is stored in the partial format storing area 31D of the text memory 31 as the character size. Further, when the down key 16 is continuously depressed, "19P" is displayed on the "size" instead of "26P" and the data of "19P" is stored in the partial format storing area 31B of the text memory 31 as the character size of character A. According to the above, if the down key 16 is serially depressed, "38P", "26P", "19P", "13P", "10P" and "6P" are serially displayed on the liquid crystal display 4 and the data thereof is stored in the partial format storing area corresponding to each character in the text memory 31.

After procedure in S55 is conducted or if judged that key input is not done by the up and down key 16 (S54:NO), procedure directly shifts to S56. In S56, it is judged whether key input is done by the return key 10 on the keyboard 3. If judged that key input is done by the return key 10 (S56:YES), procedure returns to S2 in the main program of FIG. 2. If judged that key input is not done by the return key 10 (S56:NO), procedure returns to S51.

Here, following to the above, the main program in FIG. 2 will be described. If judged that key input is not done by the range setting key 6 (S4:NO), procedure shifts to S7. In S7, it is judged whether key input is done by the print key 9. If judged that key input is done by the print key 9 (S7:YES), procedure shifts to S8 (the printing program shown in FIG. 5). The printing process is the process that characters are printed on the print tape 100 with multi-color by using the thermal printing mechanism PM.

Hereinafter, the printing process will be described with reference to FIG. 5. First, in S60, the character positioning data 40 (see FIG. 12) is prepared according to various data stored in the text memory 31, thereafter the prepared character positioning data 40 is stored in the character positioning data storing area 35. In S61, the parameters CCT, COL are secured in the storing area 39 in the RAM 30 and the maximum value of print colors set in "character color 1" and "character color 2" is obtained based on the character positioning data 40, thereafter the obtained maximum value is substituted in the parameter CCT. And in S62, value "0" is substituted in the parameter COL. Here, value "0" in the parameter COL is defined to direct the print color "1", value "1" is defined to direct the print color "2", and value "2" is defined to direct the print color "3".

Further, if judged that value of the parameter CCT is not equal to value in the parameter COL (S63:YES), procedure shifts to S64, and the character parameters CSP, CEP and CC are secured in the storing area in the RAM 30. Further the head address number 46 of the character positioning data 40 is set to the parameter CSP, the last address number 46 is set to the parameter CEP, and value "0" is set to the parameter CC, thereby each of the parameters CSP, CEP, CC are initialized.

In S65, the data corresponding to the address number defined by the equation (CSP+(CC×10)) is read out from the character positioning data 40. Here, value "10" multiplied by the parameter CC in the equation corresponds to movement amount of address by one stage in the character positioning data 40 in FIG. 12.

In S66, it is judged whether, in the data read out from the character positioning data 40 in S65, the print color defined by value in the parameter COL is set. If judged that the print color defined by value in the parameter COL is set in the read out data (S66:YES), the print dot pattern corresponding to the code data 41 is read out in the data developing buffer 37 in S67. Further, in S68, it is judged whether value in the parameter COL corresponds to the "character color 1". If judged that the parameter COL corresponds to the "character color 1" (S68:YES), procedure shifts to S69 in which the character embellishing procedure is conducted. On the other hand, if judged that the parameter COL does not correspond to the "character color 1" (S68:No), it is judged in S72 whether the above read out data in S65 includes the embellishment data such as the bag form embellishment, the bag form embellishment with shadow or the stereo form embellishment. If such embellishment data is included in the read out data (S72:YES), the procedure for forming the blank portion is conducted in S104, thereafter procedure shifts to S75.

Here, the character embellishing program conducted in S69 will be described with reference to FIG. 6. The character embellishing process is the process that the dot pattern with various embellishment is formed based on the dot pattern with the normal embellishment. First, in S80, based on the embellishment kind data 61 which is set in the data read out from the character positioning data 40 in S65, the embellishment data 64 necessary for preparing the dot pattern is read out from the embellishing table 60, thereafter the embellishment data 64 is stored in the embellishment table storing area 37. In S81, the area for storing the pointer is secured in the storing area 39 and the pointer is set at the head position of the embellishment data 64 stored in the embellishment table storing area 37.

In S82, the embellishment data 64 corresponding to the pointer is read out, and it is judged in S83 whether the embellishment data 64 is "FFF". If judged that the embellishment data 64 is not "FFF" (S83:YES) and the third figure of the embellishment data 64 is "0" (S84:YES), procedure shifts to S85. In S85, based on the embellishment data 64, the print dot pattern in the data developing buffer 37 is transmitted to the embellishing buffer 38 and the logical OR is obtained from the print dot pattern transmitted and the dot pattern already transmitted to the embellishing buffer 38. On the other hand, if judged that the embellishment data 64 is not "FFF" (S83:YES) and the third figure is not "0" (S84:NO), procedure shifts to S86. And in S86, based on the embellishment data 64, the print dot pattern obtained by reversing the dot pattern in the data developing buffer 37 is transmitted to the embellishing buffer 38 and the logical AND is obtained from the dot pattern transmitted and the dot pattern already transmitted to the embellishing buffer 38.

After process in S85 or in S86 is conducted, procedure shifts to S87. In S87, the pointer is set to the next data in the embellishment data 64 and procedure returns to S82, thereafter, the above procedures are repeated. And if the embellishment data 64 is "FFF" (S83:NO), procedure shifts to S75 shown in FIG. 5, in which the print process is conducted.

Figure 7:
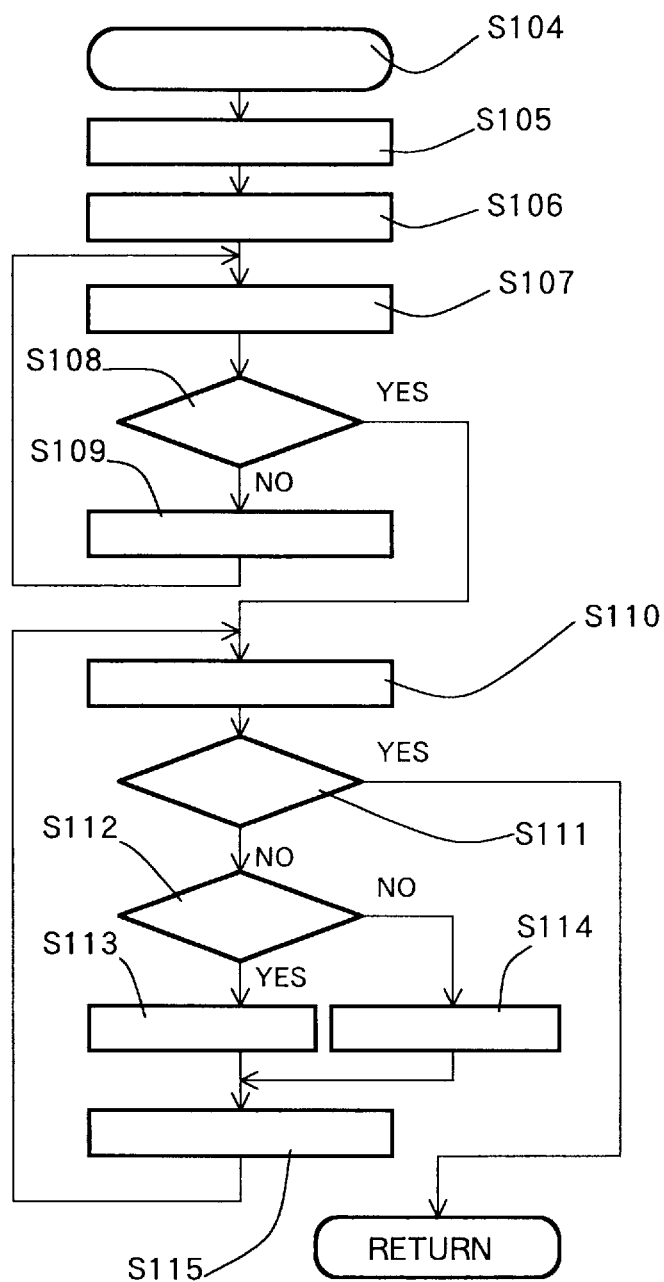
FIG. 7 is a flowchart to conduct blank portion forming program to form the blank portion within the outline portion of the character, in the tape printing apparatus.

Next, the process for forming the blank portion conducted in S104 will be described with reference to FIG. 7. This process is the process that the dot pattern of the blank portion formed within the outline portion is prepared, concerning with the characters having the blank portion therein such that the character embellishing form is set to "bag form embellishment", "bag form embellishment with shadow", "stereo form embellishment".

First, in S105, the embellishment table 60 is searched based on the format data 45 set in the data of the character positioning data 40, which is read out in S65 in the printing process shown in FIG. 5, and not only the embellishment data 60 is read out but also the read out data 60 is stored in the embellishment data table storing area 36, thereafter the embellishing buffer 38 necessary for embellishing is secured. In S106, the pointer is secured in the storing area 39 and is set at the head position of the embellishment data 60 stored in the embellishment data table storing area 36. In S107, the embellishment data corresponding to the pointer is read out.

In S108, it is judged whether the embellishment form is the embellishment with the blank portion. This judgement is done based on whether the third figure of the embellishment data 64 is set to "1". Here, if the third figure is set to "1", it concludes that the embellishment with the blank portion is set, and contrarily, if the third figure is not set to "1", it concludes that the embellishment with the blank portion is not set.

If judged that the embellishment with the blank portion is not set (S108:NO), the pointer is set to the next embellishment data 64, thereafter procedure shifts to S107. On the other hand, if judged that the embellishment with the blank portion is set (S108:YES), procedure shifts to S110. And in S110, the embellishment data 64 pointed by the pointer is read out. Thereafter, in S111, it is judged whether the read out embellishment data 64 is "FFF". If judged that the read out embellishment data 64 is not "FFF" (S11:NO), it is again judged in S112 whether the embellishment with the blank portion is set.

If judged that the embellishment with the blank portion is set (S112:YES), the print dot pattern stored in the data developing buffer 37 is transmitted to the embellishing buffer 38 based on the embellishment data 64, and the logical OR is obtained from the transmitted dot pattern and the dot pattern already transmitted to the embellishing buffer 38. Thereafter, procedure shifts to S115. On the other hand, if judged that the embellishment with the blank portion is not set (S112:NO), the print dot pattern obtained by reversing the dot pattern in the data developing buffer 37 based on the embellishment data 64 is transmitted to the embellishing buffer 38, and the logical AND is obtained from the transmitted dot pattern and the dot pattern already transmitted to the embellishing buffer 38. Thereafter, procedure shifts to S115.

In S115, the pointer is set to the next embellishment data 64, thereafter procedure returns to S110 and the above procedures are repeated. Here, if judged in S111 that the embellishment data 64 is "FFF" (S111:YES), procedure shifts to S75 in the printing process shown in FIG. 5.

Here, returning to FIG. 5. explanation of the printing process will be continued. In S75, the print dot pattern with each embellishment prepared in the embellishing buffer 38 (see FIG. 6) is transmitted to the print buffer 33 while obtaining the logical OR from the transmitted dot pattern and the dot pattern already transmitted thereto. And in case that S75 is finished or one of the embellishment for "bag form", "bag form with shadow" and "stereo form" is not set (S72:NO), the character parameter CC is increased by value 1 in S70. In S71, it is judged whether the value calculated through the equation (CSP+(CC×10)) is equal to the value of character parameter CEP. If judged that the value of above equation is not equal to the value of parameter CEP (S71:NO), procedure returns to S65 and the above procedures are repeated. On the other hand, if judged that the value of equation is equal to the value of parameter CEP (S71:YES), procedure shifts to S73. In S73, printing of characters is conducted. That is, the dot pattern data stored in the print buffer 33 is printed on the print tape 100 by the thermal printing mechanism PM. At this time, the dot pattern is printed through the ribbon part 121 in which the ribbon 122 having the color corresponding to the value "0" of the character parameter COL is installed.

Thereafter, in S74, the character parameter COL is increased by value 1 and procedure returns to S63. Further, the same procedures are conducted for the color corresponding to the value "1" of the parameter COL. In S63, if judged that the value of parameter CCT is equal to the value of parameter COL (S63:NO), procedure returns to S2 in the main program in FIG. 2.

Here, after parts of the characters are partially printed with "print color 1" according to the above procedure, if it is necessary that the remainder parts of the characters are continuously printed with "print color 2", the message "Please exchange ribbon cassette and rewind the print tape" is displayed on the liquid crystal display 4, between S63 and S64. And according to this message, the operator exchanges the ribbon cassette of "print color 1" with the ribbon cassette of "print color 2" and rewinds the print tape 100 in the print tape part 120. Thereafter, the remainder parts of the characters are printed by the ribbon having "print color 2".

Hereinafter, the print image displaying process done in S2 of the main program in FIG. 2 will be described with reference to FIG. 8. The print image displaying process means the process that the image to be printed on the print tape 100 is displayed on the liquid crystal display 4.

First. in 90, the character positioning data 40 (see FIG. 12) is prepared based on the data stored in the text memory 31 and the prepared data 40 is stored in the character positioning data storing area 35. In S91, the character positioning data 40 prepared in S90 is converted to the data for displaying.

In S92, the character parameters CSP, CEP and CC are secured and the address number 46 corresponding to the head position of the character positioning data 40 is set to the parameter CSP, the address number corresponding to the last position of the character positioning data 40 is set to the parameter CEP and value "0" is set to the parameter CC, thereby the parameters CSP, CEP and CC are initialized. In S93, the data corresponding to the address number defined by equation (CSP+(CC×10)) in the character positioning data 40 is read out. Here, value "10" multiplied by the parameter CC in the equation means movement amount of the address by one stage in the character positioning data 40 in FIG. 12.

In S94, the dot pattern is read out into the data developing buffer 37. And in S95, the character embellishing procedure as same as the process in S69 (see FIG. 5) is conducted. At this time, the process in S95 is different from the process in S69 at the point that the dot pattern data developed on the data developing buffer 37 is the dot pattern data for displaying in S95. Thereafter, in S99, the dot pattern with each embellishment prepared on the embellishing buffer 38 is transmitted to the display buffer 34 and the logical OR is obtained from the transmitted dot pattern and the dot pattern already transmitted thereto. In S96, the character parameter CC is increased by value "1". Further, in S97, it is judged whether the value defined by the equation (CSP+(CC×10)) is equal to the value of parameter CEP. If judged that the value by the equation (CSP+(CC×10)) is not equal to the value of parameter CEP (S97:NO), procedure returns to S93 and the same process is repeated. On the other hand, if judged that the value by the equation (CSP+(CC×10)) is equal to the value of parameter CEP (S97:YES), procedure shifts to S98. And in S98, the dot pattern stored in the display buffer 34 is displayed on the liquid crystal display 4 and procedure shifts to S3 in the main process in FIG. 2.

Here, returning to S7 in the main process, explanation will be continued. If judged that key input is not done by the print key 8 (S7:NO), procedure shifts to S9. And in S9, procedure according to the operated key is conducted. For example, if the character key 5 is depressed, characters such as letter, numeral, etc. are input.

Hereinafter, to easily understand the printing process done in the tape printer 1 of the embodiment, operation for forming the printed tape 100 in FIG. 1 will be described. At that time, the text data constructed from the characters "ABCD" is stored in the text memory 31, and the normal embellishment is set to the characters "A", "D" and the bag form embellishment is set to the characters "B", "C". Therefore, in the text memory 31, the character code data, the whole format and the partial format are stored as shown in FIG. 11 and various data necessary for character positioning is stored in the character positioning data storing area 35 as shown in FIG. 12, corresponding to the code data of each character. Further, "print color 1" is set to the normal characters "A", "D", and concerning with the embellished characters "B", "C" "print color 1" is set to the outline portion and "print color 2" is set to the blank portion.

Under the above condition, when the print key 8 is depressed, the print process is started. First, the character dot pattern of the character "A" is prepared and transmitted to the print buffer 33 (S60–S62, S63:YES, S64, S65, S66:YES, S67, S68:YES, S69, S75). And after S70, S71 (S71:NO), the same process is conducted about the character "B". Here, in the character "B", "print color 1" is set to only the outline portion, therefore the dot pattern is prepared for only the outline portion and transmitted to the print buffer 33 (S60–S62, S63:Yes, S64, S65, S66:YES, S67, S68:YES, S69, S75). Concerning with the character "C", the print dot pattern is prepared for only the outline portion to which "print color 1" is set and transmitted to the print buffer 33 (S60–S62, S63:YES, S64, S65, S66:YES, S67, S68:YES, S69, S75). As mentioned, concerning with the characters "B", "C", the print dot pattern is prepared for only the outline portion to which "print color 1" is set, on the other hand, the print dot pattern is not prepared for the blank portion to which "print color 2" is set (S66). Further, though the same process is conducted for the character "D". At that time, since the character "D" is embellished with normal form similar to the character "A", the print dot pattern is prepared for the character "D" and is transmitted to the print buffer 33 (S60–S62, S63:YES, S64, S65, S66:YES, S67, S68:YES, S69, S75).

After the above process, judgement in S71 becomes YES, thereby whole character "A", the outline portion of the character "B", the outline portion of the character "C" and whole character "D" are printed on the print tape 100 according to "print color 1" through the thermal head 26 (S73). Thereafter, value "1" (corresponding to "print color 2") is set to the character parameter COL (S74), and the same process is conducted each character. At that time, since printing of the characters "A", "D" is finished with "print color 1", the dot pattern of the characters "A", "D" are no longer printed (S60–S62, S63:YES, S64, S65, S66:NO). On the other hand, since "print color 2" is set to the blank portion of the characters "B", "C", the dot pattern is prepared for the blank portion and transmitted to the print buffer 33 (S60–S62, S63:YES, S64, S65, S66:YES, S67, S68:NO, S72:YES, S104, S75). Thereafter, judgement in S71 becomes YES, thereby the blank portions of the characters "B", "C" are printed according to "print color 2" on the print tape 100 through the thermal head 26 (S73). And value "2" (corresponding to "print color 3") is set to the parameter COL (S74), However, since "print color 3" is not set to all characters in the above example, judgement in S63 becomes NO. Based on this judgement, the printing process is finished. According to the mentioned process, the printed tape 100 shown in FIG. 1 is formed.

As mentioned in detail, in the tape printer 1 according to the embodiment, when one kind of the embellishment with the blank portion such as "bag form", "bag form with shadow", or "stereo form" is set to the characters input though the character key 5 on the keyboard 3 (S9, S55) and the numeral corresponding to "print color 1" and "print color 2" is set to the characters (S55), and further the characters are printed with multi-color on the print tape 100 though the thermal printing mechanism PM (S73), the outline portions of the characters to which the embellishment with the blank portion is set are printed with "print color 1" and the blank portions of the thus embellished characters are printed with "print color 2". Therefore, the outline portion and the blank portion in the character can be printed with different color, respectively. As a result, the outward appearance of the embellished characters can be remarkably improved.

And when one kind of the embellishment with the blank portion such as "bag form", "bag form with shadow", or "stereo form" is set to the characters input though the character key 5 on the keyboard 3 (S9, S55) and the same numeral is set to both "print color 1" and "print color 2" (S55), "none" is displayed in the item "print color 2" on the format setting place of the liquid crystal display 4, thereby setting of "print color 2" is canceled. Therefore, even if the characters embellished so as to have the blank portion are printed with multi-color by the thermal printing mechanism PM (S73), only the outline portions in the such characters are printed with "print color 1". Thus, it can avoid that the outline portions and the blank portions in the characters are printed with the same color, as a result, it can prevent the blank portions from disappearing in the characters.

Further, when one kind of the embellishment "normal form" or "emphasis form" is set to the characters input though the character key 5 on the keyboard 3 (S9, S55), "none" is displayed in the item "print color 2" on the format setting place of the liquid crystal display 4, thereby it is inhibited to set "print color 2". Thus, it can prevent the blank portions from vainly being set to "print color 2" in case of the character with the normal or emphasis embellishment.

And when one kind of the embellishment with the blank portion such as "bag form", "bag form with shadow", or "stereo form" is set to the characters input though the character key 5 on the keyboard 3 (S9, S55) and the numeral corresponding to "print color 1" is set to the characters (S55), and further the characters are printed with multi-color on the print tape 100 through the thermal printing mechanism PM (S73), the outline portions of the characters to which the embellishment with the blank portion is set are printed with "print color 1". Therefore, it can omit setting of "print color 2".

While the invention has been particularly shown and described with reference to preferred embodiments thereof, it will be understood by those skilled in the art that the foregoing and other changes in form and details can be made therein without departing from the spirit and scope of the invention. For example, though three kinds of characters having the embellishment of "bag form", "bag form with shadow" and "stereo form" are raised as the characters embellished with the blank portion and the tape printer 1 of the embodiment is constructed so that the outline portions are printed with "print color 1" and the blank portions are printed with "print color 2", it is conceivable the other embodiment which can print characters with various types of the embellishment. For instance, it is conceivable the tape printer 1 so as to be able to set a shadow print mode in which only the shadow portion of the bag form is printed and a lateral stripe print mode in which the character is represented by the lateral stripe and is printed. In such tape printer 1, it can print the character with two colors ("print color 1" and "print color 2") by setting "print color 2" to the white portion except for the shadow portion or the lateral stripe portion, similar to the cases of the above "bag form", "bag form with shadow" and "stereo form".

What is claimed is:

1. A printing apparatus comprising:
   input means for inputting character;
   embellishment means for selectively embellishing the character input by the input means in a first form that the character is embellished so as to have an outline portion and a blank portion;
   color set means for setting among various colors a first print color and a second print color to the character embellished by the embellishment means;
   first color judging means for judging whether both the first print color and the second print color are mutually set to the same color;
   prohibit means for prohibiting set of the second print color to the blank portion of the embellished character in the first form when it is judged by the first color judging means that both the first print color and the second print color are mutually set to the same color; and
   print means for printing the embellished character so that the outline portion is printed with the first print color and the blank portion is printed with the second print color.

2. The printing apparatus according to claim 1, wherein the color set means sets the first print color to the outline portion and sets the second print color to the blank portion.

3. The printing apparatus according to claim 2, wherein the embellishment means is able to embellish the character input by the input means in a second form that the character is normally embellished so as not to have the blank portion.

4. The printing apparatus according to claim 3, further comprising embellishment judging means for judging whether the embellished character is in the first form or in the second form.

5. The printing apparatus according to claim 4, wherein the prohibit means prohibits set of the second print color to the blank portion when it is judged by the embellishment judging means that the embellished character is in the first form.

6. The printing apparatus according to claim 5, wherein the print means prints only the outline portion of the embellished character with the first print color.

7. The printing apparatus according to claim 5, wherein the prohibit means prohibits that the second print color is set to the normally embellished character when it is judged by the embellishment judging means that the embellished character is in the second form.

8. The printing apparatus according to claim 7, wherein the print means prints the whole embellished character with the first print color.

9. The printing apparatus according to claim 4, wherein the print means includes dot pattern product means for producing dot pattern of the embellished character.

10. The printing apparatus according to claim 9, further comprising second color judging means for judging whether the first print color is set to the embellished character.

11. The printing apparatus according to claim 10, wherein the dot pattern product means produces the dot pattern corresponding to a part of the embellished character to which the first print color is set and the print means prints the part with the first print color based on the produced dot pattern.

12. The printing apparatus according to claim 11, wherein the print means prints the outline portion with the first print color in case of the embellished character with the blank portion and prints the whole character with the first print color in case of the normally embellished character without the blank portion.

13. The printing apparatus according to claim 10, wherein the dot pattern product means produces the dot pattern corresponding to the blank portion when it is judged by the second color judging means that the first print color is not set to the embellished character and judged by the embellishment judging means that the embellished character is in the first form.

14. The printing apparatus according to claim 13, wherein the print means prints the blank portion with the second print color based on the produced dot pattern.

15. The printing apparatus according to claim 1, wherein the first form includes at least bag form embellishment, bag form embellishment with shadow and stereo form embellishment.

16. The printing apparatus according to claim 3, wherein the second form includes at least normal form embellishment and emphasis form embellishment.

17. A tape printing apparatus for preparing print tape on which character is printed, the tape printing apparatus comprising:

input means for inputting the character;

embellishment means for selectively embellishing the character input by the input means in a first form that the character is embellished so as to have an outline portion and a blank portion;

color set means for setting among various colors a first print color and a second print color to the character embellished by the embellishment means;

first color judging means for judging whether both the first print color and the second print color are mutually set to the same color;

prohibit means for prohibiting set of the second print color to the blank portion of the embellished character in the first form when it is judged by the first color judging means that both the first print color and the second print color are mutually set to the same color; and thermal print mechanism for thermally printing the embellished character so that the outline portion is printed with the first print color and the blank portion is printed with the second print color on the print tape.

* * * * *